United States Patent Office.

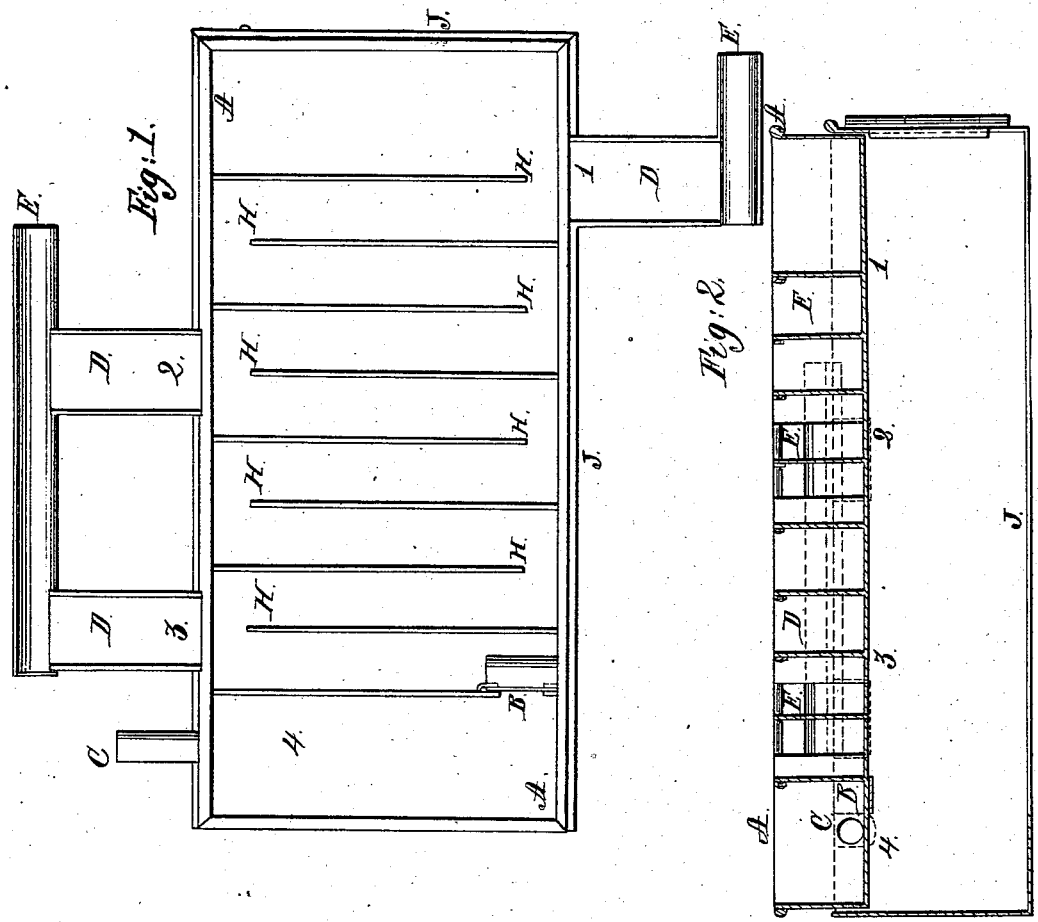

L. D. PENY, OF LAURA, OHIO.

Letters Patent No. 61,562, dated January 29, 1867.

IMPROVED SELF-SKIMMING SORGHUM EVAPORATOR.

The Schedule referred to in these Letters Patent and making part of the same.

TO ALL WHOM IT MAY CONCERN:

Be it known that I, L. D. PENY, of Laura, county of Miami, and State of Ohio, have invented a Self-Skimming Sorghum Evaporator; and I do hereby declare the following to be an exact description thereof, reference being had to the accompanying drawings and to the letters of reference marked thereon, making a part of this specification, in which—

Figure 1 represents a top view of the evaporator; and

Figure 2 a longitudinal sectional view of the evaporator, with the furnace underneath.

A represents the pan, intended to be made about five inches in height, and contains four divisions or apartments, numbered 1, 2, 3, 4. The opening No. 1 carries off all the green skimmings; opening No. 2 carries off all the brown skimmings; opening No. 3 carries off the white skimmings or foam, leaving the molasses, clear of any scum or sediment foreign to it, to be passed through the gate B in the last division, to be finished and drawn off at the spout C. At each opening a spout, D, passes off the skimmings by the trough E. I have a fire surface, a furnace, J, under the whole bottom of the pan. The boiling of the juice all over the bottom of the pan causes it to rise and force the scum out over the openings in the sides of the pan, and thus the scum passes off. The pan rests on the top of the furnace at an incline, so that the juice can pass through the openings H at each partition, until it passes through the gate B, and is discharged at the spout C.

By my invention one man can do the work of three men, as no skimmers are needed, as the juice passes in a regular flow from the first opening to the last opening, and is discharged at the spout C, completely separating and freeing itself of the scum.

What I claim as my invention, and desire to secure by Letters Patent, is—

The pan A, as constructed with the divisions 1, 2, 3, 4, gate B, skimming openings D, and trough E, when arranged, combined, and operating as herein described, and for the purposes set forth.

L. D. PENY.

Witnesses:
SOLOMON BOEKWALTER,
CHAS. FAIR.